United States Patent
Kim

(10) Patent No.: US 10,700,744 B2
(45) Date of Patent: Jun. 30, 2020

(54) METHOD OF CONFIGURING REFERENCE SIGNAL FOR OPEN-LOOP MULTI-ANTENNA TRANSMISSION IN WIRELESS COMMUNICATION SYSTEM AND APPARATUS THEREFOR

(71) Applicant: LG ELECTRONICS INC., Seoul (KR)

(72) Inventor: Hyungtae Kim, Seoul (KR)

(73) Assignee: LG ELECTRONICS INC., Seoul (KR)

(\*) Notice: Subject to any disclaimer, the term of this patent is extended or adjusted under 35 U.S.C. 154(b) by 13 days.

(21) Appl. No.: 15/667,970

(22) Filed: Aug. 3, 2017

(65) Prior Publication Data

US 2018/0123647 A1     May 3, 2018

Related U.S. Application Data

(60) Provisional application No. 62/454,792, filed on Feb. 4, 2017, provisional application No. 62/453,493, filed
(Continued)

(51) Int. Cl.
*H04B 7/02*     (2018.01)
*H04L 5/00*     (2006.01)
(Continued)

(52) U.S. Cl.
CPC ......... *H04B 7/028* (2013.01); *H04B 7/0478* (2013.01); *H04L 1/0025* (2013.01);
(Continued)

(58) Field of Classification Search
CPC ....... H04B 7/028; H04B 7/068; H04L 1/0606; H04L 5/0098; H04L 5/0007; H04W 72/0406
See application file for complete search history.

(56) References Cited

U.S. PATENT DOCUMENTS

| | | | |
|---|---|---|---|
| 2008/0144733 A1* | 6/2008 | Elgamal | H04L 1/0003 375/267 |
| 2012/0087321 A1* | 4/2012 | Han | H04L 5/005 370/329 |

(Continued)

OTHER PUBLICATIONS

PCT International Application No. PCT/KR2017/007171, Notification of Transmittal of the International Search Report and the Written Opinion of the International Searching Authority, or Declaration dated Oct. 24, 2017, 9 pages.
(Continued)

*Primary Examiner* — Jean B Corrielus
(74) *Attorney, Agent, or Firm* — Lee, Hong, Degerman, Kang & Waimey

(57) ABSTRACT

A method of receiving a downlink channel, which is received by a user equipment from an eNB in a wireless communication system, is disclosed in the present specification. Specifically, the method includes the steps of receiving a downlink control channel for receiving a DM-RS (demodulation reference signal) based downlink data channel from the eNB, and receiving the DM-RS based downlink data channel using DM-RS configuration information included in the downlink control channel. In this case, if single-codeword transmission via the DM-RS based downlink data channel is indicated by the downlink control channel, the DM-RS based downlink data channel is received using a transmission diversity scheme. If two-codewords transmission via the DM-RS based downlink data channel is indicated by the downlink control channel, the DM-RS based downlink data channel is received using a spatial multiplexing scheme.

4 Claims, 8 Drawing Sheets

Related U.S. Application Data on Feb. 1, 2017, provisional application No. 62/419,405, filed on Nov. 8, 2016, provisional application No. 62/417,302, filed on Nov. 3, 2016.

(51) Int. Cl.
| | | |
|---|---|---|
| *H04L 1/00* | (2006.01) | |
| *H04B 7/0456* | (2017.01) | |
| *H04L 1/06* | (2006.01) | |
| *H04W 72/04* | (2009.01) | |
| *H04B 7/06* | (2006.01) | |
| *H04B 7/10* | (2017.01) | |

(52) U.S. Cl.
CPC .......... *H04L 1/0606* (2013.01); *H04L 5/0051* (2013.01); *H04L 5/0091* (2013.01); *H04W 72/0406* (2013.01); *H04B 7/065* (2013.01); *H04B 7/068* (2013.01); *H04B 7/10* (2013.01); *H04L 5/0007* (2013.01); *H04L 5/0098* (2013.01)

(56) References Cited

U.S. PATENT DOCUMENTS

| | | | |
|---|---|---|---|
| 2013/0021991 A1* | 1/2013 | Ko | H04B 7/0413 370/329 |
| 2013/0121276 A1* | 5/2013 | Kim | H04W 72/0406 370/329 |
| 2013/0155921 A1 | 6/2013 | Gomadam et al. | |
| 2013/0235811 A1* | 9/2013 | Li | H04B 7/0452 370/329 |
| 2013/0242853 A1* | 9/2013 | Seo | H04L 5/0023 370/315 |
| 2013/0250879 A1* | 9/2013 | Ng | H04W 72/042 370/329 |
| 2014/0056188 A1* | 2/2014 | Yang | H04L 5/0053 370/280 |
| 2014/0071952 A1* | 3/2014 | Kim | H04L 5/001 370/335 |
| 2014/0293881 A1 | 10/2014 | Khoshnevis et al. | |
| 2015/0049704 A1 | 2/2015 | Park et al. | |
| 2015/0381395 A1* | 12/2015 | Guo | H04L 5/0014 370/329 |
| 2016/0261328 A1* | 9/2016 | Kim | H04B 7/0632 |
| 2018/0007675 A1* | 1/2018 | Zhang | H04L 5/0016 |
| 2018/0070351 A1* | 3/2018 | Ko | H04L 5/0053 |

OTHER PUBLICATIONS

CATT, "WF on Transmission Scheme for Semi-Open-Loop", 3GPP TSG RAN WG1 Meeting #86bis, R1-1610598, Oct. 2016, 4 pages.

CATT, "On remaining issues for hybrid CSI", 3GPP TSG RAN WG1 Meeting #86bis, R1-1608728, Oct. 2016, 4 pages.

\* cited by examiner

— Prior Art —

FIG. 2
-- Prior Art --
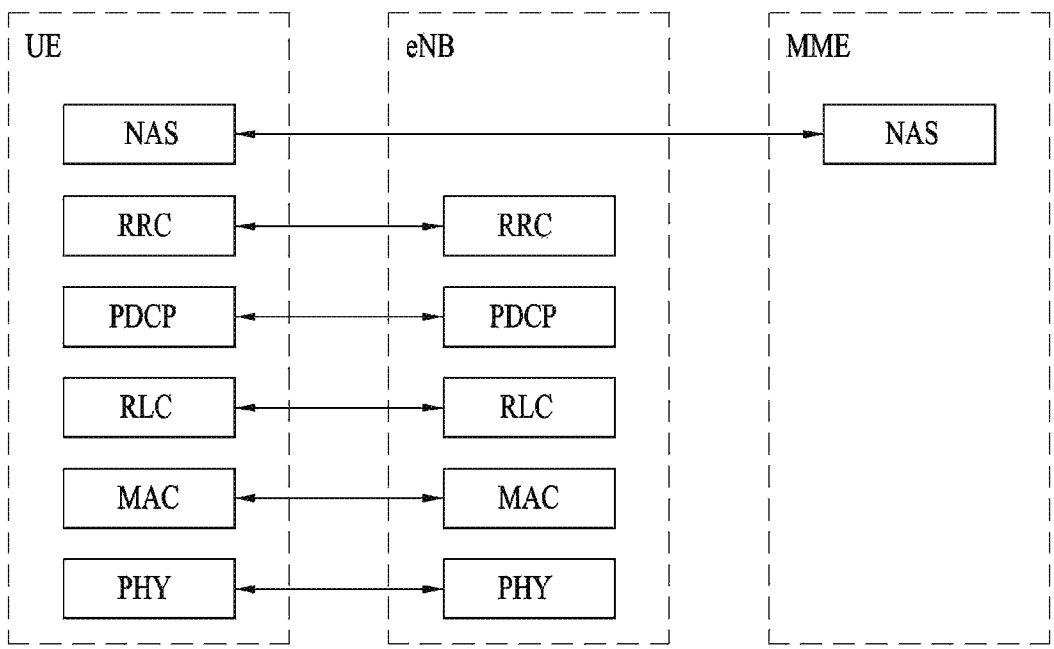
(A) CONTROL-PLANE PROTOCOL STACK
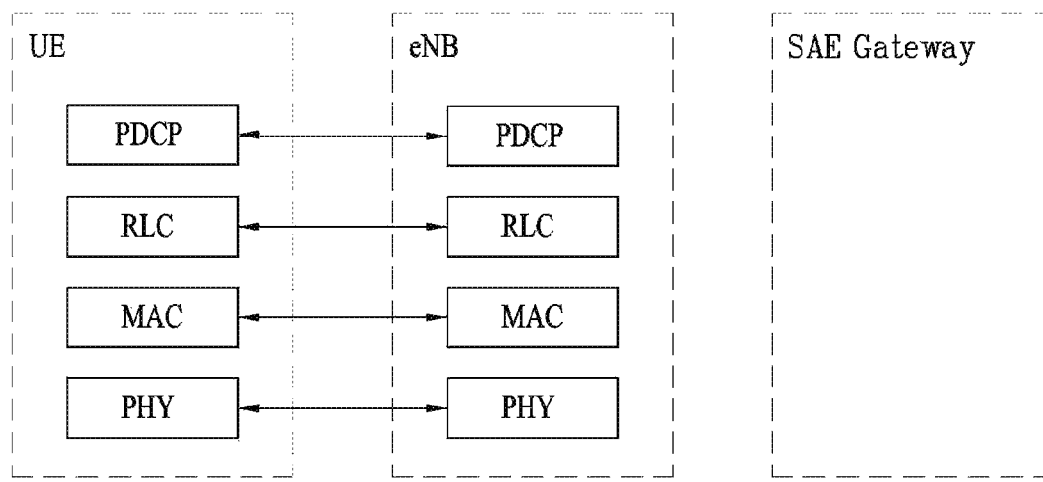
(B) USER-PLANE PROTOCOL STACK -- Prior Art --

— Prior Art —

METHOD OF CONFIGURING REFERENCE SIGNAL FOR OPEN-LOOP MULTI-ANTENNA TRANSMISSION IN WIRELESS COMMUNICATION SYSTEM AND APPARATUS THEREFOR

Pursuant to 35 U.S.C. § 119(e), this application claims the benefit of U.S. Provisional Patent Application Nos. 62/417,302, filed on Nov. 3, 2016, 62/419,405, filed on Nov. 8, 2016, 62/453,493, filed on Feb. 1, 2017, and 62/454,792, filed on Feb. 4, 2017, the contents of which are all hereby incorporated by reference herein in their entirety.

BACKGROUND OF THE INVENTION

Field of the Invention

The present invention relates to a wireless communication system, and more particularly, to a method of configuring a reference signal for open-loop multi-antenna transmission in a wireless communication system and an apparatus therefor.

Discussion of the Related Art

As an example of a mobile communication system to which the present invention is applicable, a 3rd generation partnership project long term evolution (hereinafter, referred to as LTE) communication system is described in brief.

FIG. 1 is a diagram schematically illustrating a network structure of an E-UMTS as an exemplary radio communication system. An evolved universal mobile telecommunications system (E-UMTS) is an advanced version of a legacy universal mobile telecommunications system (UMTS) and basic standardization thereof is currently underway in 3GPP. E-UMTS may be generally referred to as an LTE system. For details of the technical specifications of UMTS and E-UMTS, reference can be made to Release 7 and Release 8 of "3rd Generation Partnership Project; Technical Specification Group Radio Access Network".

Referring to FIG. 1, the E-UMTS includes a user equipment (UE), evolved Node Bs (eNode Bs or eNBs), and an access gateway (AG) which is located at an end of an evolved UMTS terrestrial radio access network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.25, 2.5, 5, 10, 15, and 20 MHz to provide a downlink or uplink transmission service to multiple UEs. Different cells may be configured to provide different bandwidths. The eNB controls data transmission and reception to and from a plurality of UEs. Regarding downlink (DL) data, the eNB transmits DL scheduling information to notify a corresponding UE of a time/frequency domain within which data is to be transmitted, coding, data size, and hybrid automatic repeat and request (HARQ)-related information by transmitting DL scheduling information to the UE. In addition, regarding uplink (UL) data, the eNB transmits UL scheduling information to a corresponding UE to inform the UE of an available time/frequency domain, coding, data size, and HARQ-related information. An interface for transmitting user traffic or control traffic between eNBs may be used. A core network (CN) may include the AG and a network node for user registration of the UE. The AG manages mobility of a UE on a tracking area (TA) basis, each TA including a plurality of cells.

Although radio communication technology has been developed up to LTE based on wideband code division multiple access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, a simplified structure, an open interface, appropriate power consumption of a UE, etc. are required.

SUMMARY OF THE INVENTION

Accordingly, the present invention is directed to an apparatus and method thereof that substantially obviate one or more problems due to limitations and disadvantages of the related art.

An object of the present invention is to provide a method of configuring a reference signal for open-loop multi-antenna transmission in a wireless communication system and an apparatus therefor based on the aforementioned discussion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a method of receiving a downlink channel, which is received by a user equipment from an eNB in a wireless communication system, includes the steps of receiving a downlink control channel for receiving a DM-RS (demodulation reference signal) based downlink data channel from the eNB, and receiving the DM-RS based downlink data channel using DM-RS configuration information included in the downlink control channel. In this case, if single-codeword transmission via the DM-RS based downlink data channel is indicated by the downlink control channel, the DM-RS based downlink data channel is received using a transmission diversity scheme. If two-codewords transmission via the DM-RS based downlink data channel is indicated by the downlink control channel, the DM-RS based downlink data channel can be received using a spatial multiplexing scheme.

To further achieve these objects and other advantages and in accordance with the purpose of the invention, as embodied and broadly described herein, according to one embodiment, a method of transmitting a downlink channel, which is transmitted by an eNB to a user equipment in a wireless communication system, includes the steps of transmitting a downlink control channel for a DM-RS (demodulation reference signal) based downlink data channel to the user equipment, and transmitting the DM-RS based downlink data channel to the user equipment according to DM-RS configuration information included in the downlink control channel. In this case, if single-codeword transmission via the DM-RS based downlink data channel is indicated in the downlink control channel, the DM-RS based downlink data channel is transmitted using a transmission diversity scheme. If two-codewords transmission via the DM-RS based downlink data channel is indicated by the downlink control channel, the DM-RS based downlink data channel can be transmitted using a spatial multiplexing scheme.

Preferably, if the single-codeword transmission via the DM-RS based downlink data channel is indicated by the downlink control channel, the DM-RS based downlink data channel is transmitted using a SFBC (space frequency block coding)-based transmission diversity scheme on antenna ports 7 and 8. On the contrary, if the two-codewords transmission via the DM-RS based downlink data channel is indicated by the downlink control channel, the DM-RS based downlink data channel is transmitted using a co-phase cycling based spatial multiplexing scheme on antenna ports 7 and 8.

Moreover, the DM-RS configuration information indicates that the DM-RS is transmitted via two layers corresponding to antenna ports 7 and 8, respectively. In this case, the DM-RS configuration information includes a scrambling identifier of the DM-RS.

According to embodiments of the present invention, a UE is able to more efficiently report feedback information for DM-RS based downlink transmission in a wireless communication system.

It will be appreciated by persons skilled in the art that that the effects that can be achieved through the present invention are not limited to what has been particularly described hereinabove and other advantages of the present invention will be more clearly understood from the following detailed description.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 2 is a diagram illustrating structures of a control plane and a user plane of a radio interface protocol between a UE and an E-UTRAN based on the 3GPP radio access network specification;

DETAILED DESCRIPTION OF THE INVENTION

Figure 1:
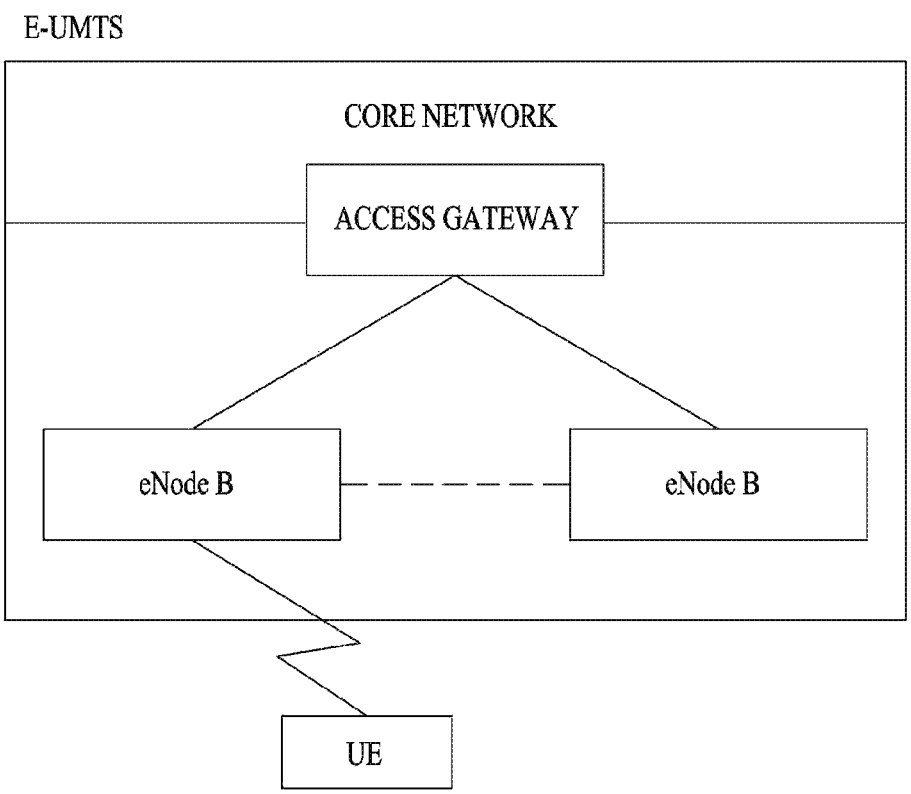
FIG. 1 is a diagram schematically illustrating a network structure of an E-UMTS as an exemplary radio communication system.

Hereinafter, structures, operations, and other features of the present invention will be readily understood from the embodiments of the present invention, examples of which are illustrated in the accompanying drawings. Embodiments which will be described hereinbelow are examples in which technical features of the present invention are applied to a 3GPP system.

Although the embodiments of the present invention will be described based on an LTE system and an LTE-advanced (LTE-A) system, the LTE system and the LTE-A system are purely exemplary and the embodiments of the present invention can be applied to any communication system corresponding to the aforementioned definition. In addition, although the embodiments of the present invention will be described based on frequency division duplexing (FDD), the FDD mode is purely exemplary and the embodiments of the present invention can easily be applied to half-FDD (H-FDD) or time division duplexing (TDD) with some modifications.

In the present disclosure, a base station (eNB) may be used as a broad meaning including a remote radio head (RRH), an eNB, a transmission point (TP), a reception point (RP), a relay, etc.

FIG. 2 is a diagram illustrating structures of a control plane and a user plane of a radio interface protocol between a UE and an E-UTRAN based on 3GPP radio access network specifications. The control plane refers to a path used for transmission of control messages, which is used by the UE and the network to manage a call. The user plane refers to a path in which data generated in an application layer, e.g. voice data or Internet packet data, is transmitted.

A physical layer of a first layer provides an information transfer service to an upper layer using a physical channel. The physical layer is connected to a media access control (MAC) layer of an upper layer via a transmission channel Data is transmitted between the MAC layer and the physical layer via the transmission channel Data is also transmitted between a physical layer of a transmitter and a physical layer of a receiver via a physical channel. The physical channel uses time and frequency as radio resources. Specifically, the physical channel is modulated using an orthogonal frequency division multiple Access (OFDMA) scheme in DL and is modulated using a single-carrier frequency division multiple access (SC-FDMA) scheme in UL.

The MAC layer of a second layer provides a service to a radio link control (RLC) layer of an upper layer via a logical channel. The RLC layer of the second layer supports reliable data transmission. The function of the RLC layer may be implemented by a functional block within the MAC layer. A packet data convergence protocol (PDCP) layer of the second layer performs a header compression function to reduce unnecessary control information for efficient transmission of an Internet protocol (IP) packet such as an IPv4 or IPv6 packet in a radio interface having a relatively narrow bandwidth.

A radio resource control (RRC) layer located at the bottommost portion of a third layer is defined only in the control plane. The RRC layer controls logical channels, transmission channels, and physical channels in relation to configuration, re-configuration, and release of radio bearers. A radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A non-access stratum (NAS) layer located at an upper level of the RRC layer performs functions such as session management and mobility management.

DL transmission channels for data transmission from the network to the UE include a broadcast channel (BCH) for transmitting system information, a paging channel (PCH) for transmitting paging messages, and a DL shared channel (SCH) for transmitting user traffic or control messages. Traffic or control messages of a DL multicast or broadcast service may be transmitted through the DL SCH or may be transmitted through an additional DL multicast channel (MCH). Meanwhile, UL transmission channels for data transmission from the UE to the network include a random access channel (RACH) for transmitting initial control messages and a UL SCH for transmitting user traffic or control messages. Logical channels, which are located at an upper level of the transmission channels and are mapped to the transmission channels, include a broadcast control channel (BCCH), a paging control channel (PCCH), a common control channel (CCCH), a multicast control channel (MCCH), and a multicast traffic channel (MTCH).

Figure 3:
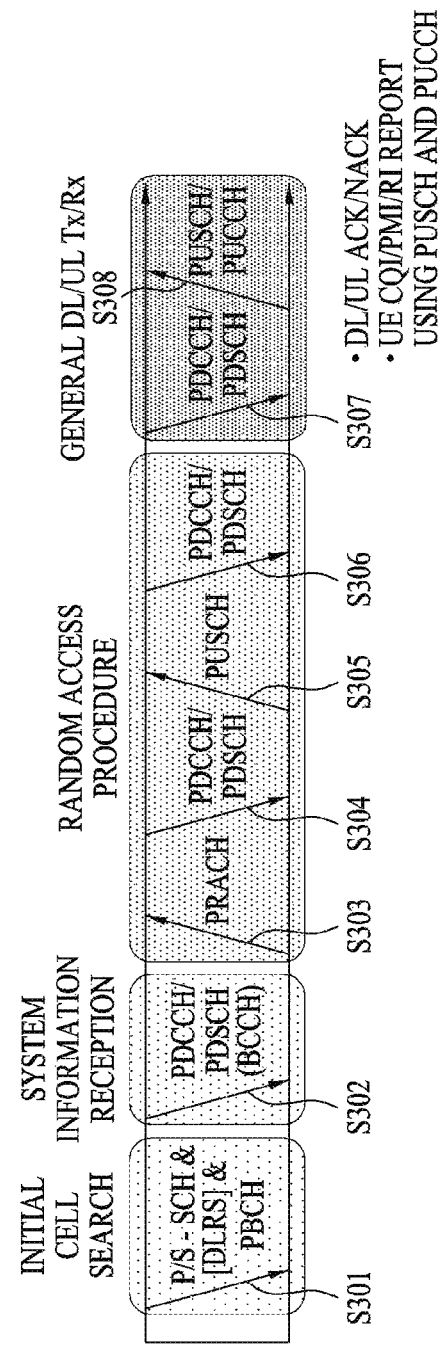
FIG. 3 is a diagram illustrating physical channels used in a 3GPP system and a general signal transmission method using the same.

FIG. 3 is a diagram illustrating physical channels used in a 3GPP system and a general signal transmission method using the same.

When power is turned on or the UE enters a new cell, the UE performs an initial cell search procedure such as acquisition of synchronization with an eNB (S301). To this end, the UE may adjust synchronization with the eNB by receiving a primary synchronization channel (P-SCH) and a secondary synchronization channel (S-SCH) from the eNB and acquire information such as a cell identity (ID). Thereafter, the UE may acquire broadcast information within the cell by receiving a physical broadcast channel from the eNB. In the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB on DL includes a DL/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Figure 4:
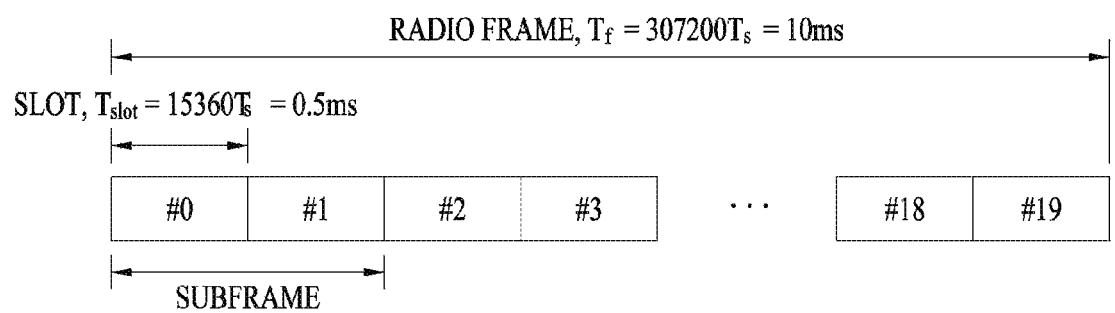
FIG. 4 is a diagram illustrating the structure of a radio frame used in an LTE system.

FIG. 4 is a diagram illustrating the structure of a radio frame used in an LTE system.

Referring to FIG. 4, the radio frame has a length of 10 ms (327200×Ts) and includes 10 equal-sized subframes. Each of the subframes has a length of 1 ms and includes two slots. Each slot has a length of 0.5 ms (15360 Ts). In this case, Ts denotes a sampling time represented by Ts=1415 kHz× 2048)= 3.2552×10-8 (about 33 ns). Each slot includes a plurality of OFDM symbols in the time domain and includes a plurality of resource blocks (RBs) in the frequency domain. In the LTE system, one RB includes 12 subcarriers×7 (or 6) OFDM symbols. A transmission time interval (TTI), which is a unit time for data transmission, may be determined in units of one or more subframes. The above-described structure of the radio frame is purely exemplary and various modifications may be made in the number of subframes included in a radio frame, the number of slots included in a subframe, or the number of OFDM symbols included in a slot.

Figure 5:
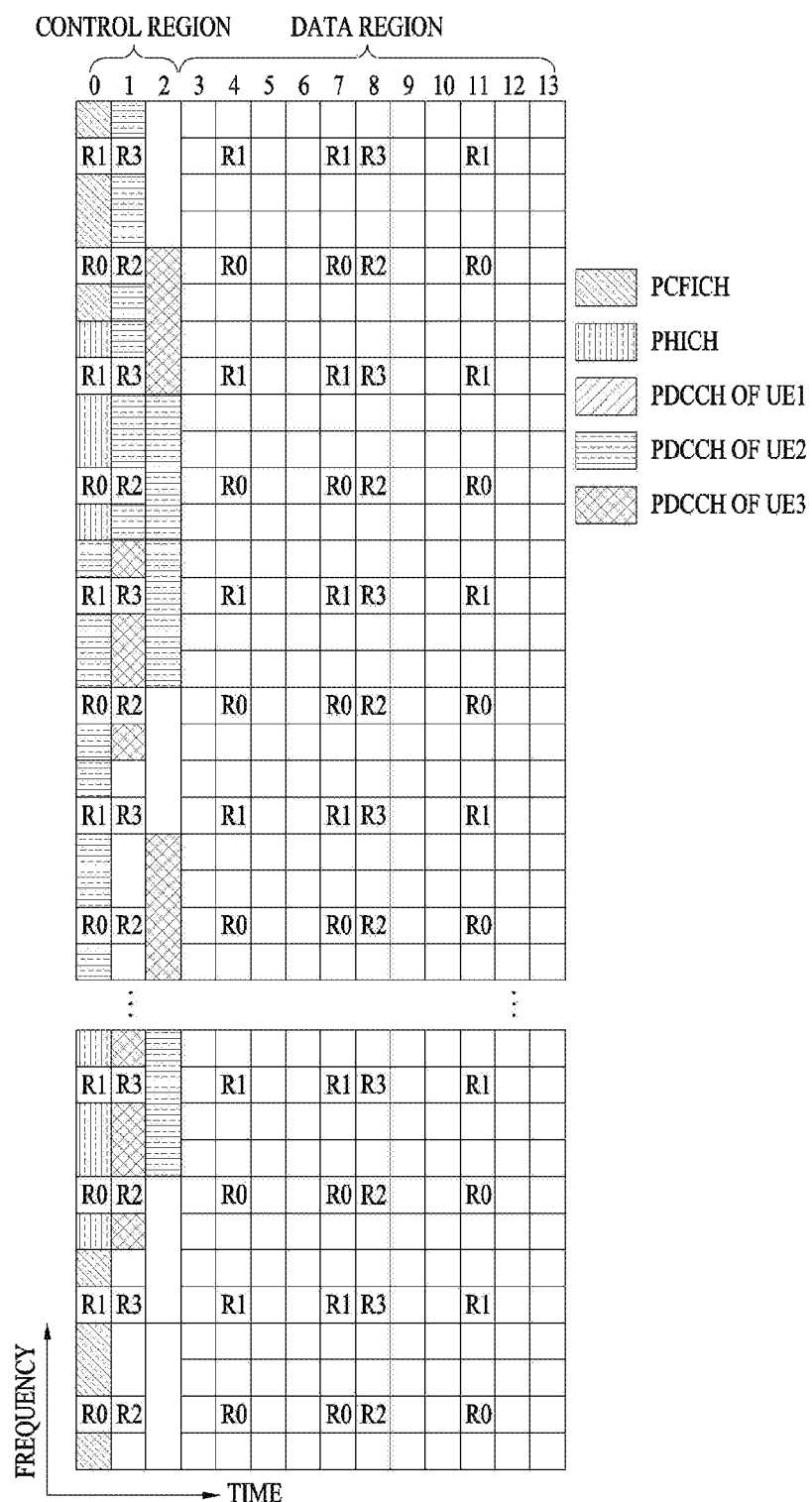
FIG. 5 is a diagram illustrating the structure of a DL radio frame used in an LTE system.

FIG. 5 is a diagram illustrating control channels included in a control region of one subframe in a DL radio frame.

Referring to FIG. 5, one subframe includes 14 OFDM symbols. The first to third ones of the 14 OFDM symbols may be used as a control region and the remaining 11 to 13 OFDM symbols may be used as a data region, according to subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources unused for RSs in the control region. Traffic channels are allocated to resources unused for RSs in the data region. The control channels allocated to the control region include a physical control format indicator channel (PCFICH), a physical hybrid-ARQ indicator channel (PHICH), a physical downlink control channel (PDCCH), etc.

The PCFICH, physical control format indicator channel, informs a UE of the number of OFDM symbols used for the PDCCH in every subframe. The PCFICH is located in the first OFDM symbol and is configured with priority over the PHICH and the PDCCH. The PCFICH is composed of 4 resource element groups (REGs) and each of the REGs is distributed over the control region based on a cell ID. One REG includes 4 resource elements (REs). An RE indicates a minimum physical resource defined as one subcarrier by one OFDM symbol. The PCFICH value indicates values of 1 to 3 or values of 2 to 4 depending on bandwidth and is modulated using quadrature phase shift keying (QPSK).

The PHICH, physical hybrid-ARQ indicator channel, is used to carry a HARQ ACK/NACK signal for UL transmission. That is, the PHICH indicates a channel through which DL ACK/NACK information for UL HARQ is transmitted. The PHICH includes one REG and is cell-specifically scrambled. The ACK/NACK signal is indicated by 1 bit and is modulated using binary phase shift keying (BPSK). The modulated ACK/NACK signal is spread with a spreading factor (SF) of 2 or 4. A plurality of PHICHs mapped to the same resource constitutes a PHICH group. The number of PHICHs multiplexed to the PHICH group is determined depending on the number of spreading codes. The PHICH (group) is repeated three times to obtain diversity gain in the frequency domain and/or the time domain.

The PDCCH is allocated to the first n OFDM symbols of a subframe. In this case, n is an integer equal to or greater than 1, indicated by the PCFICH. The PDCCH is composed of one or more control channel elements (CCEs). The PDCCH informs each UE or UE group of information associated with resource allocation of transmission channels, that is, a paging channel (PCH) and a downlink shared channel (DL-SCH), UL scheduling grant, HARQ information, etc. The PCH and the DL-SCH are transmitted through a PDSCH. Therefore, the eNB and the UE transmit and receive data through the PDSCH except for particular control information or service data.

Information indicating to which UE or UEs PDSCH data is to be transmitted and information indicating how UEs should receive and decode the PDSCH data are transmitted on the PDCCH. For example, assuming that a cyclic redundancy check (CRC) of a specific PDCCH is masked by a radio network temporary identity (RNTI) 'A' and information about data transmitted using a radio resource 'B' (e.g. frequency location) and using DCI format 'C', i.e. transport format information (e.g. a transport block size, a modulation scheme, coding information, etc.), is transmitted in a specific subframe, a UE located in a cell monitors the PDCCH, i.e. blind-decodes the PDCCH, using RNTI information thereof in a search space. If one or more UEs having RNTI 'A' are present, the UEs receive the PDCCH and receive a PDSCH indicated by 'B' and 'C' based on the received information of the PDCCH.

Figure 6:
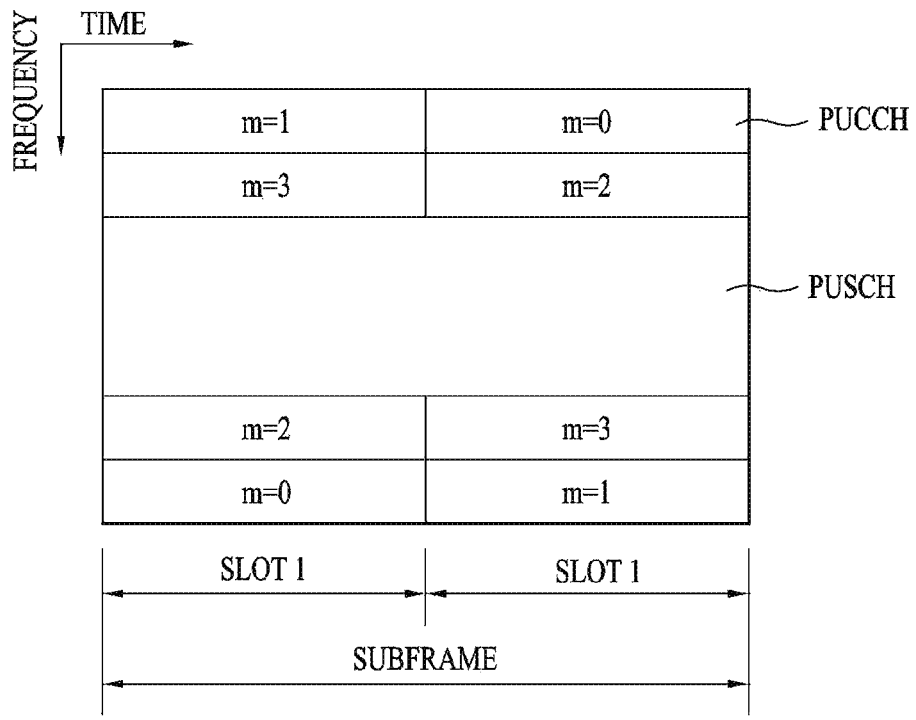
FIG. 6 is a diagram illustrating the structure of a UL subframe in an LTE system.

FIG. 6 is a diagram illustrating the structure of a UL subframe in an LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a channel quality indicator (CQI) representing a downlink channel state, an RI for Multiple Input and Multiple Output (MIMO), a scheduling request (SR) indicating a request for allocation of UL resources, etc. A PUCCH of a UE uses one RB occupying different frequencies in each slot of a subframe. That is, two RBs allocated to the PUCCH frequency-hop over the slot boundary. Particularly, PUCCHs for m=0, m=1, m=2, and m=3 are allocated to a subframe in FIG. 6.

Hereinafter, a MIMO system will be described. MIMO refers to a method using multiple transmit antennas and multiple receive antennas to improve data transmission/reception efficiency. Namely, a plurality of antennas is used at a transmitter or a receiver of a wireless communication system so that capacity can be increased and performance can be improved. MIMO may also be referred to as multi-antenna in this disclosure.

MIMO technology does not depend on a single antenna path in order to receive a whole message. Instead, MIMO technology completes data by combining data fragments received via multiple antennas. The use of MIMO technology can increase data transmission rate within a cell area of a specific size or extend system coverage at a specific data transmission rate. MIMO technology can be widely used in mobile communication terminals and relay nodes. MIMO technology can overcome a limited transmission capacity encountered with the conventional single-antenna technology in mobile communication.

Figure 7:
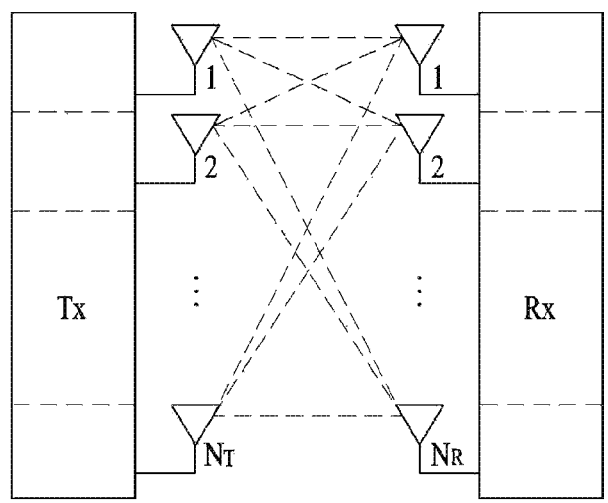
FIG. 7 is a diagram illustrating a configuration of a general MIMO communication system.

FIG. 7 illustrates the configuration of a typical MIMO communication system. A transmitter has NT transmit (Tx) antennas and a receiver has NR receive (Rx) antennas. Use of a plurality of antennas at both the transmitter and the receiver increases a theoretical channel transmission capacity, compared to the use of a plurality of antennas at only one of the transmitter and the receiver. Channel transmission capacity increases in proportion to the number of antennas. Therefore, transmission rate and frequency efficiency are increased. Given a maximum transmission rate Ro that may be achieved with a single antenna, the transmission rate may be increased, in theory, to the product of Ro and a transmission rate increase rate Ri in the case of multiple antennas, as indicated by Equation 1. Ri is the smaller of NT and NR.

$$R_i = \min(N_T, N_R) \quad \text{[Equation 1]}$$

For example, a MIMO communication system with four Tx antennas and four Rx antennas may theoretically achieve a transmission rate four times that of a single antenna system. Since the theoretical capacity increase of the MIMO wireless communication system was verified in the mid-1990s, many techniques have been actively developed to increase data transmission rate in real implementations. Some of these techniques have already been reflected in various wireless communication standards including standards for 3rd generation (3G) mobile communications, next-generation wireless local area networks, etc.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transmission rate.

Communication in a MIMO system will be described in detail through mathematical modeling. It is assumed that $N_T$ Tx antennas and $N_R$ Rx antennas are present as illustrated in FIG. 7. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

Individual pieces of the transmission information $s_1, s_2, \ldots, s_{N_T}$ may have different transmit powers. If the individual transmit powers are denoted by $P_1, P_2, \ldots, P_{N_T}$, respectively, then the transmission power-controlled transmission information may be given as $$\hat{s} = [\hat{s}_1, \hat{s}_2, \ldots, \hat{s}_{N_T}]^T P_1 s_1, P_2 s_2, \ldots, P_{N_T} s_{N_T}]^T \quad \text{[Equation 3]}$$

The transmission power-controlled transmission information vector $\hat{S}$ may be expressed below, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

Meanwhile, NT transmission signals $x_1, x_2, \ldots, x_{N_T}$ to be actually transmitted may be configured by multiplying the transmission power-controlled information vector $\hat{S}$ by a weight matrix W. The weight matrix W functions to appropriately distribute the transmission information to individual antennas according to transmission channel states, etc. The transmission signals $x_1, x_2, \ldots, x_{N_T}$ are represented as a vector X, which may be determined by Equation 5. Here, $w_{ij}$ denotes a weight of an i-th Tx antenna and a j-th piece of information. W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$

[Equation 5]

Generally, the physical meaning of the rank of a channel matrix is the maximum number of different pieces of information that can be transmitted on a given channel. Therefore, the rank of a channel matrix is defined as the smaller of the number of independent rows and the number of independent columns in the channel matrix. Accordingly, the rank of the channel matrix is not larger than the number of rows or columns of the channel matrix. The rank of the channel matrix H (rank(H)) is restricted as follows.

$$\text{rank}(H) \leq \min(N_T, N_R)$$ [Equation 6]

A different piece of information transmitted in MIMO is referred to as a transmission stream or stream. A stream may also be called a layer. It is thus concluded that the number of transmission streams is not larger than the rank of channels, i.e. the maximum number of different pieces of transmittable information. Thus, the channel matrix H is determined by $$\text{\# of streams} \leq \text{rank}(H) \leq \min(N_T, N_R)$$ [Equation 7]

"# of streams" denotes the number of streams. It should be noted that one stream may be transmitted through one or more antennas.

One or more streams may be mapped to a plurality of antennas in many ways. This method may be described as follows depending on MIMO schemes. If one stream is transmitted through a plurality of antennas, this may be regarded as spatial diversity. When a plurality of streams is transmitted through a plurality of antennas, this may be spatial multiplexing. A hybrid scheme of spatial diversity and spatial multiplexing may be contemplated.

Now a detailed description of an RS will be given.

In general, a transmitter transmits an RS known to both the transmitter and a receiver to the receiver along with data so that the receiver may perform channel measurement in the RS. The RS serves to perform demodulation by indicating a modulation scheme as well as channel measurement. The RS is classified into a dedicated RS (DRS) for a specific UE and a common RS (or cell-specific RS (CRS)) for all UEs within a cell. The CRS includes an RS used by a UE to measure a CQI/PMI/RI to be reported to an eNB. This RS is referred to as a channel state information-RS (CSI-RS).

A DM-RS which is a dedicated reference signal is supported for PDSCH transmission and is transmitted on antenna port(s) p=5, p=7, p=8 or p=7, 8, . . . , υ+6 (where, υ is the number of layers used for PDSCH transmission). The DM-RS exists when PDSCH transmission is associated with the antenna port and is a valid reference only for PDSCH demodulation. The DM-RS is transmitted only on RBs to which the PDSCHs are mapped.

That is, the DM-RS is configured to be transmitted only on RBs, to which the PDSCHs are mapped, in a subframe in which the PDSCHs are scheduled, unlike a CRS configured to be transmitted in every subframe regardless of presence/absence of the PDSCH. In addition, the DM-RS is transmitted only via antenna port(s) corresponding to layer(s) of the PDSCHs, unlike the CRS transmitted via all antenna port(s) regardless of the number of layers of the PDSCHs. Accordingly, overhead of the RS may be reduced as compared to the CRS.

Hereinafter, channel state information (CSI) report will be described. In the current LTE standard, two transmission schemes, i.e., an open-loop MIMO scheme operating without channel information and a closed-loop MIMO scheme based on channel information exist. In particular, in the closed-loop MIMO scheme, in order to obtain multiplexing gain of a MIMO antenna, an eNB and a UE may perform beamforming based on channel state information. The eNB transmits a reference signal to the UE and instructs the UE to feed back the channel state information measured based thereon via a physical uplink control channel (PUCCH) or a physical uplink shared channel (PUSCH), in order to obtain the channel state information from the UE.

The CSI is roughly divided into a rank indicator (RI), a precoding matrix index (PMI) and a channel quality indicator (CQI). First, the RI indicates the rank information of a channel as described above and means the number of streams which may be received by the UE via the same time-frequency resources. In addition, the RI is determined by long term fading of the channel and thus is fed back to the eNB at a period longer than that of the PMI or CQI. Second, the PMI has a channel space property and indicates a precoding index of the eNB preferred by the UE based on a metric such a signal to interference plus noise ratio (SINR). Lastly, the CQI indicates the intensity of the channel and means a reception SINR obtained when the eNB uses the PMI.

An advanced system such as an LTE-A system considers additional multi-user diversity through multi-user MIMO (MU-MIMO). Due to interference between UEs multiplexed in an antenna domain in MU-MIMO, the accuracy of CSI may significantly affect interference with other multiplexed UEs as well as a UE that reports the CSI. Accordingly, more accurate CSI than in single-user MIMO (SU-MIMO) should be reported in MU-MIMO.

In this context, the LTE-A standard has determined to separately design a final PMI as a long-term and/or wideband PMI, W1, and a short-term and/or subband PMI, W2. For example, a long-term covariance matrix of channels expressed as Equation 8 may be used for hierarchical codebook transformation that configures one final PMI with W1 and W2.

$$W = \text{norm}(W1 W2)$$ [Equation 8]

In Equation 8, W2 is a short-term PMI, which is a codeword of a codebook reflecting short-term channel information, W is a codeword of a final codebook, and norm (A) is a matrix obtained by normalizing each column of matrix A to 1.

Conventionally, the codewords W1 and W2 are given as Equation 9.

$$W1(i) = \begin{bmatrix} X_i & 0 \\ 0 & X_i \end{bmatrix},$$ [Equation 9]

-continued where $X_i$ is $Nt/2$ by $M$ matrix.

$$W2(j) = \overbrace{\begin{bmatrix} e_M^k & e_M^l & \cdots & e_M^m \\ \alpha_j e_M^k & \beta_j e_M^l & & \gamma_j e_M^m \end{bmatrix}}^{r \; columns}$$

(if rank = $r$), where $1 \leq k, l, m \leq M$ and $k, l, m$ are integer.

In Equation 9, the codewords are designed so as to reflect correlation characteristics between established channels, if cross-polarized antennas are densely arranged, for example, the distance between adjacent antennas is equal to or less than half a signal wavelength. The cross-polarized antennas may be divided into a horizontal antenna group and a vertical antenna group and the two antenna groups are co-located, each having the property of a uniform linear array (ULA) antenna.

Therefore, the correlations between antennas in each group have the same linear phase increment property and the correlation between the antenna groups is characterized by phase rotation. Since a codebook is quantized values of channels, it is necessary to design a codebook reflecting channel characteristics. For convenience of description, a rank-1 codeword designed in the above manner may be given as Equation 10.

$$W1(j) * W2(j) = \begin{bmatrix} X_i(k) \\ \alpha_j X_i(k) \end{bmatrix} \quad \text{[Equation 10]}$$

In Equation 10, a codeword is expressed as an $N_T \times 1$ vector where NT is the number of Tx antennas and the codeword is composed of an upper vector $X_i(k)$ and a lower vector $\alpha_j X_i(k)$, representing the correlation characteristics of the horizontal and vertical antenna groups, respectively. $X_i(k)$ is expressed as a vector having the linear phase increment property, reflecting the correlation characteristics between antennas in each antenna group. For example, a discrete Fourier transform (DFT) matrix may be used for $X_i(k)$.

Research has currently been actively conducted on introduction of an active antenna system (AAS) in next generation mobile communication. The AAS is a technology that can be more efficiently applied to perform beamforming or reduce interference by changing an antenna pattern according to circumstance.

When the AAS is configured as a two-dimensional AAS (2D-AAS), it is possible to more actively change a transmission beam according to a position of a receiving end by more efficiently and three-dimensionally adjusting a main lobe of an antenna in terms of antenna pattern.

Figure 8:
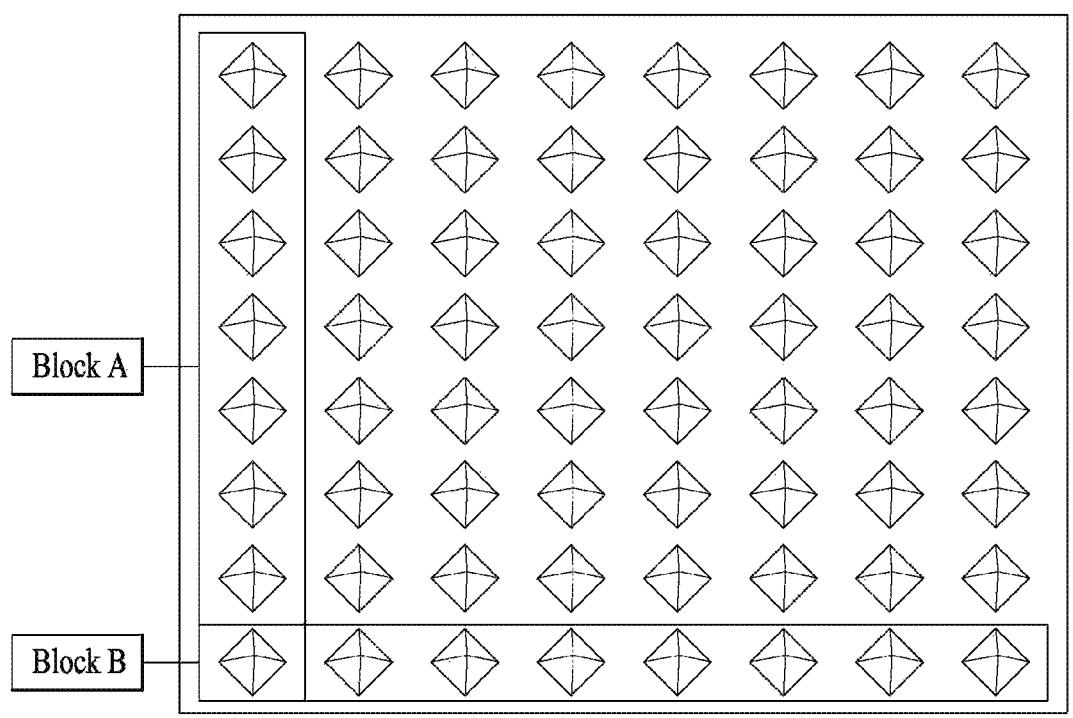
FIG. 8 illustrates an example of implementation of the 2D-AAS.

FIG. 8 illustrates an example of implementation of the 2D-AAS. In particular, FIG. 8 presumes a co-polarized antenna array in which each antenna element has the same polarization. Referring to FIG. 8, the 2D-AAS is established by mounting a large number of antennas in vertical and horizontal directions.

In a FD (full dimension)-MIMO system to which 2D-AAS is applied, an eNB can set a plurality of CSI-RS resources to a UE in a single CSI process. In this case, the CSI process corresponds to a feedback operation performed on channel information using an independent feedback configuration.

In this case, the UE does not regard the CSI-RS resources configured in a CSI process as an independent channel. Instead, the UE aggregates the resources with each other and assumes the resources as a huge CSI-RS resource to calculate and feedback CSI from the CSI-RS resource. For example, if the eNB sets three 4-port CSI-RS resources to the UE in a single CSI process, the UE aggregates the resources with each other and assumes a single 12-port CSI-RS resource. The UE calculates and feedbacks CSI using the 12-port PMI from the 12-port CSI-RS resource. This reporting mode is referred to as a class A CSI reporting in LTE-A system.

On the contrary, the UE may assume each CSI-RS resource as an independent channel, select one from among CSI-RS resources, and calculate and report CSI on the basis of the selected resource. In particular, the UE selects a CSI-RS of a robust channel from among the 8 CSI-RSs, calculates CSI on the basis of the selected CSI-RS, and reports the CSI to the eNB. In this case, the UE additionally reports the selected CSI-RS to the eNB via a CRI (CSI-RS resource indicator). For example, if a channel of a first CSI-RS corresponding to T(0) is strongest, the UE configures the channel as CSI=0 and reports the CSI-RS to the eNB. This reporting mode is referred to as class B CSI reporting in LTE-A system.

In order to effectively show the aforementioned characteristic, a variable described in the following can be defined in a CSI process in the class B. K corresponds to the number of CSI-RS resources existing in a CSI process. $N_k$ corresponds to the number of CSI-RS ports of a $k^{th}$ CSI-RS resource.

Prior to the description of the present invention, the LD-CDD scheme of the current LTE system will be described. Currently, in the LTE system, the LD-CDD scheme is defined as shown in Equation 11 below.

$$\begin{bmatrix} y^{(0)}(i) \\ \vdots \\ y^{(P-1)}(i) \end{bmatrix} = W(i)D(i)U \begin{bmatrix} x^{(0)}(i) \\ \vdots \\ x^{(v-1)}(i) \end{bmatrix} \quad \text{[Equation 11]}$$

In Equation 11, $x(i) = [x^{(0)}(i) \ldots x^{(v-1)}(i)]^T$ denotes a data symbol vector, to which precoding is not applied, and $y(i) = [y^{(0)}(i) \ldots y^{(P-1)}(i)]^T$ denotes a transmitted signal vector, to which precoding is applied. In addition, v and P denote the number of transmission layers and the number of antenna ports, respectively. In addition, in Equation 11, W(i) means a precoding matrix for adjusting a channel. Accordingly, an appropriate codeword may be selected and used from a codebook according to channel change.

However, currently, in the LD-CDD scheme of the LTE system, the codeword is not selected for use according to channel state. W(i) used in the LTE system is shown in Equation 12 below.

$$\begin{cases} W(i) = C_1 & \text{for 2 antenna ports} \\ W(i) = C_k, k = \left(\left\lfloor \frac{i}{v} \right\rfloor \mod 4\right) + & \\ 1 \in \{1, 2, 3, 4\} & \text{for 4 antenna ports} \end{cases} \quad \text{[Equation 12]}$$

In Equation 12, $C_k$ denotes a codeword. With a fixed value or a value having a constant pattern, W(i) corresponds to the changed channel.

In contrast, in Equation 11, D(i) and U serve to mix all transmission layers in a domain to distribute signals of a layer domain in all virtual antennas with the same ratio. Thus, all layers have the same channel quality. Averaging the layers serves to reduce signal overhead. For example, when a linear minimum mean square error (MMSE) scheme is used in a receiver, only one CQI may be fed back and individual HARQ retransmission is not required for different layers, thereby reducing downlink control signaling. Currently, D(i) and U used in the LTE system are defined as shown in Table 1 below.

Accordingly, recently, an LD-CDD method for changing the vertical beams was proposed. However, the LD-CDD method for changing the vertical beams has one problem.

Fundamentally, in the LD-CDD method of the current LTE system, the eNB and the UE know the precoder shown in Equation 11 in advance. In addition, the eNB notifies the UE of channels from horizontal antenna ports to the UE via the CRS for the horizontal antenna port and the UE applies the precoder to the channel found using the CRS to find a final channel. Here, when the eNB, which has installed the 2D-AAS, changes and uses the precoder for the vertical

TABLE 1

| Number of layers $\upsilon$ | U | D(i) |
|---|---|---|
| 2 | $\frac{1}{\sqrt{2}}\begin{bmatrix} 1 & 1 \\ 1 & e^{-j2\pi/2} \end{bmatrix}$ | $\begin{bmatrix} 1 & 0 \\ 0 & e^{-j2\pi i/2} \end{bmatrix}$ |
| 3 | $\frac{1}{\sqrt{3}}\begin{bmatrix} 1 & 1 & 1 \\ 1 & e^{-j2\pi/3} & e^{-j4\pi/3} \\ 1 & e^{-j4\pi/3} & e^{-j8\pi/3} \end{bmatrix}$ | $\begin{bmatrix} 1 & 0 & 0 \\ 0 & e^{-j2\pi i/3} & 0 \\ 0 & 0 & e^{-j4\pi i/3} \end{bmatrix}$ |
| 4 | $\frac{1}{2}\begin{bmatrix} 1 & 1 & 1 & 1 \\ 1 & e^{-j2\pi/4} & e^{-j4\pi/4} & e^{-j6\pi/4} \\ 1 & e^{-j4\pi/4} & e^{-j8\pi/4} & e^{-j12\pi/4} \\ 1 & e^{-j6\pi/4} & e^{-j12\pi/4} & e^{-j18\pi/4} \end{bmatrix}$ | $\begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix}$ |

Generalization of the LD-CDD system will now be described. In Equation 11, W(i) is defined as a precoder related to a channel, U is generalized to a unitary matrix, and D(i) is generalized to a diagonal matrix in which diagonal terms have the same magnitude and a phase difference such as Equation 13.

$$D(i) = \begin{bmatrix} 1 & 0 & \cdots & 0 \\ 0 & e^{j\theta_{1,i}} & \cdots & 0 \\ \vdots & \vdots & \ddots & 0 \\ 0 & 0 & 0 & e^{j\theta_{\upsilon-1,i}} \end{bmatrix}$$ [Equation 13]

Referring to Equation 13, D(i) performs phase shift according to frequency. When the generalized W(i), D(i) and U are inserted into Equation 11, all layers are subjected to beamforming changed according to frequency by D(i) and U. More specifically, a covariance matrix of a transmission vector y is calculated as shown in Equation 14 below.

$$R_{yy}^{(i)}=E[y(i))^H]=W(i)D(i)UU^H(D(i))^H(W(i))^H=W(i)(W(i))^H$$ [Equation 14]

If it is assumed that is used for a precoder for increasing channel gain by maximally using a high eigenvalue of the channel, in Equation 14, D(i) and U concentrate on averaging the channel quality of all layers while preserving such channel gain, because D(i) and U do not change the covariance matrix of the transmission vector.

As described above, when 2D-AAS is established in an eNB, vertical antennas are also installed. When an existing LD-CDD method obtains diversity gain while exchanging the horizontal beams, the 2D-AAS eNB preferably changes the vertical beams in order to obtain large diversity gain.

beams, CRS ports corresponding in number to the total number of antenna ports of the eNB are necessary. However, currently, since the CRS is defined by four antenna ports, a DM-RS based LD-CDD scheme was proposed. Currently, according to the LTE standard, using the DM-RS, LD-CDD transmission through up to eight layers may be possible.

In the following, a DM-RS in 3GPP LTE-A system is explained in detail. A DM-RS sequence r(m) is mapped to complex modulation symbols $a_{k,l}^{(p)}$ in a PRB having a frequency-domain index nPRB, which is assigned to transmit PDSCH, for an antenna port index p=7, p=8, or p=7, 8, . . . , $\upsilon$+6 according to equation 15 described in the following.

$$a_{k,l}^{(p)}=w_p(l')\cdot r(3\cdot l'\cdot N_{RB}^{max,DL}+3\cdot n_{PRB}+m')$$ [Equation 15]

In this case, $W_p^{(l)}$, 1, m' are given as equation 16 described in the following.

$$w_p(i) = \begin{cases} \overline{w}_p(i) & (m' + n_{PRB})\bmod 2 = 0 \\ \overline{w}_p(3-i) & (m' + n_{PRB})\bmod 2 = 1 \end{cases}$$ [Equation 16]

$$k = 5m' + N_{sc}^{RB}n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l'\bmod 2 + 2 & \text{if in a special subframe with configuraion 3, 4, or 8} \\ l'\bmod 2 + 2 + 3\lfloor l'/2 \rfloor & \text{if in a special subframe with configuraion 1, 2, 6, or 7} \\ l'\bmod 2 + 5 & \text{if not in a special subframe} \end{cases}$$

-continued $$l' = \begin{cases} 0, 1, 2, 3 & \text{if } n_s\text{mod}2 = 0 \text{ and} \\ & \text{in a special subframe with} \\ & \text{configuraion 1, 2, 6, or 7} \\ 0, 1 & \text{if } n_s\text{mod}2 = 0 \text{ and} \\ & \text{not in special subframe with} \\ & \text{configuraion 1, 2, 6, or 7} \\ 2, 3 & \text{if } n_s\text{mod}2 = 1 \text{ and} \\ & \text{not in special subframe with} \\ & \text{configuraion 1, 2, 6, or 7} \end{cases}$$

$$m' = 0, 1, 2$$

In this case, a length-4 sequence $\overline{w}_p^{(i)}$ for a normal CP (i.e., OCC (orthogonal cover code)) is provided according to an antenna port index as shown in Table 2 in the following.

TABLE 2

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |
| 13 | [+1 −1 −1 +1] |
| 14 | [−1 +1 +1 −1] |

A DM-RS sequence r(m) is defined for an antenna port $p \in \{7, 8, \ldots, \upsilon+6\}$ as shown in equation 17 in the following.

$$r(m) = \frac{1}{\sqrt{2}}(1 - 2 \cdot c(2m)) + j\frac{1}{\sqrt{2}}(1 - 2 \cdot c(2m+1)),$$ [Equation 17]

$$m = \begin{cases} 0, 1, \ldots, 12N_{RB}^{max,DL} - 1 & \text{normal cyclic prefix} \\ 0, 1, \ldots, 16N_{RB}^{max,DL} - 1 & \text{extended cyclic prefix} \end{cases}$$

In equation 17, c(i) corresponds to a pseudo-random sequence and can be defined by a gold sequence of length-31. An output sequence c(n) of length-$M_{PN}$ (in this case, n=0, 1, ..., $M_{PN}$−1) is defined by equation 18 described in the following.

$$c(n)=(x_1(n+N_C)+x_2(n+N_C))\bmod 2$$

$$x_1(n+31)=(x_1(n+3)+x_1(n))\bmod 2$$

$$x_2(n+31)=(x_2(n+3)+x_2(n+2)+x_2(n+1)+x_2(n))\bmod 2 \quad \text{[Equation 18]}$$

In equation 18, NC=1600, a first m-sequence is initialized by x1(0)=1, x1(n)=0, n=1, 2, ..., 30, and a second m-sequence is denoted by $c_{init}=\Sigma_{i=0}^{30}x_2(i)\cdot 2^i$ including a value according to the application of the sequence. In equation 18, a pseudo-random sequence for generating c(i) is initialized to $c_{init}$ according to equation 19 described in the following at the beginning of each subframe.

$$c_{init}=(\lfloor n_s/2\rfloor+1)\cdot(2N_{ID}^{cell}+1)\cdot 2^{16}+n_{SCID} \quad \text{[Equation 19]}$$

In equation 19, unless a value of $n_{SCID}$ (scrambling identifier) is specified by a specific value, the $n_{SCID}$ corresponds to 0. The $n_{SCID}$ is given by a DCI format 2B or 2C associated with PDSCH transmission in response to PDSCH transmitted from an antenna port 7 or 8. The DCI format 2B corresponds to a DCI format for PDSCH that uses maximum 2 antenna ports having a DM-RS. The DCI format 2C corresponds to a DCI format for PDSCH that uses maximum 8 antenna ports having a DM-RS.

Recently, as shown in equation 20 and equation 21, discussion on a semi open-loop downlink transmission scheme is in progress in 3GPP standardization. In particular, in equation 20 and equation 21, $\overline{p}=7$.

$$\begin{bmatrix} y^{(\overline{p})}(2i) \\ y^{(\overline{p}+1)}(2i) \\ y^{(\overline{p})}(2i+1) \\ y^{(\overline{p}+1)}(2i+1) \end{bmatrix} = \frac{1}{\sqrt{2}}\begin{bmatrix} 1 & j & 0 & 0 \\ 0 & 0 & -1 & j \\ 0 & 0 & 1 & j \\ 1 & -j & 0 & 0 \end{bmatrix}\begin{bmatrix} \text{Re}(x^{(0)}(i)) \\ \text{Im}(x^{(0)}(i)) \\ \text{Re}(x^{(1)}(i)) \\ \text{Im}(x^{(1)}(i)) \end{bmatrix} \quad \text{[Equation 20]}$$

$$\begin{bmatrix} y^{(\overline{p})}(i) \\ y^{(\overline{p}+1)}(i) \end{bmatrix} = \begin{bmatrix} 1 & j & 1 & j \\ e^{j\theta_n} & je^{j\theta_n} & -e^{j\theta_n} & -je^{-j\theta_n} \end{bmatrix}\begin{bmatrix} \text{Re}(x^{(0)}(i)) \\ \text{Im}(x^{(0)}(i)) \\ \text{Re}(x^{(1)}(i)) \\ \text{Im}(x^{(1)}(i)) \end{bmatrix} \quad \text{[Equation 21]}$$

(Where, $\theta_n = \pi(i\bmod 2)/2$)

In equations 20 and 21, i corresponds to a modulation symbol index. The equation 20 denotes an SFBC-based transmission diversity scheme corresponding to a semi open-loop downlink transmission scheme in case of rank 1. The equation 21 denotes a co-phase cycling scheme corresponding to a semi open-loop downlink spatial multiplexing transmission scheme in case of rank 2. Referring to equations 20 and 21, it is able to know that downlink transmission is performed using DM-RS antenna ports 7 and 8 in response to both the rank 1 and the rank 2.

In particular, unlike the legacy DM-RS based transmission, the DM-RS based open-loop transmission uses the DM-RS antenna ports 7 and 8 irrespective of a transmission rank. For clarity, information for DM-RS configuration defined in current LTE standard document is explained. DM-RS configuration information is indicated according to Tables 3 and 4 described in the following via a field included in DCI which is received on PDCCH. A Table to be used is determined by RRC configuration.

TABLE 3

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 | 0 | 2 layers, ports 7-8, $n_{SCID}$ = 0 |
| 1 | 1 layer, port 7, $n_{SCID}$ = 1 | 1 | 2 layers, ports 7-8, $n_{SCID}$ = 1 |
| 2 | 1 layer, port 8, $n_{SCID}$ = 0 | 2 | 3 layers, ports 7-9 |
| 3 | 1 layer, port 8, $n_{SCID}$ = 1 | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

TABLE 4

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 1 layer, port 7, $n_{SCID}$ = 0 (OCC = 2) | 0 | 2 layer, port 7-8, $n_{SCID}$ = 0 (OCC = 2) |
| 1 | 1 layer, port 7, $n_{SCID}$ = 1 (OCC = 2) | 1 | 2 layer, port 7-8, $n_{SCID}$ = 1 (OCC = 2) |
| 2 | 1 layer, port 8, $n_{SCID}$ = 0 (OCC = 2) | 2 | 2 layer, port 7-8, $n_{SCID}$ = 0 (OCC = 4) |
| 3 | 1 layer, port 8, $n_{SCID}$ = 1 (OCC = 2) | 3 | 2 layer, port 7-8, $n_{SCID}$ = 1 (OCC = 4) |
| 4 | 1 layer, port 7, $n_{SCID}$ = 0 (OCC = 4) | 4 | 2 layer, port 11, 13, $n_{SCID}$ = 0 (OCC = 4) |
| 5 | 1 layer, port 7, $n_{SCID}$ = 1 (OCC = 4) | 5 | 2 layer, port 11, 13, $n_{SCID}$ = 1 (OCC = 4) |
| 6 | 1 layer, port 8, $n_{SCID}$ = 0 (OCC = 4) | 6 | 3 layer, port 7-9 |
| 7 | 1 layer, port 8, $n_{SCID}$ = 1 (OCC = 4) | 7 | 4 layer, port 7-10 |
| 8 | 1 layer, port 11, $n_{SCID}$ = 0 (OCC = 4) | 8 | 5 layer, port 7-11 |
| 9 | 1 layer, port 11, $n_{SCID}$ = 1 (OCC = 4) | 9 | 6 layer, port 7-12 |
| 10 | 1 layer, port 13, $n_{SCID}$ = 0 (OCC = 4) | 10 | 7 layers, ports 7-13 |
| 11 | 1 layer, port 13, $n_{SCID}$ = 1 (OCC = 4) | 11 | 8 layers, ports 7-14 |
| 12 | 2 layers, ports 7-8 | 12 | Reserved |
| 13 | 3 layers, ports 7-9 | 13 | Reserved |
| 14 | 4 layers, ports 7-10 | 14 | Reserved |
| 15 | Reserved | 15 | Reserved |

Yet, as shown in the equations 20 and 21, since the DM-RS based open-loop transmission to which the present invention is applied uses the DM-RS antenna ports 7 and 8 irrespective of a transmission rank, it is necessary to redefine the Tables 3 and 4.

In particular, in Table 4, in case of a single codeword (one codeword), since {DM-RS port 7-8, 2 layers} is defined in an index 12, it is necessary to newly define {DM-RS port 7-8, 1 layer}. In case of dual codeword (two codeword), since information corresponding to 2 layers is already defined in an index (i.e., value 0) to an index 5 (i.e., value 5), it is necessary to newly define information corresponding to 1 layer. In this case, in case of dual codeword, information corresponding to 2 layers, which are necessary to be newly defined, are shown in Table 5 in the following.

TABLE 5

| |
|---|
| 1 layer, port 7-8, $n_{SCID}$ = 0 (OCC = 2) |
| 1 layer, port 7-8, $n_{SCID}$ = 1 (OCC = 2) |
| 1 layer, port 7-8, $n_{SCID}$ = 0 (OCC = 4) |
| 1 layer, port 7-8, $n_{SCID}$ = 1 (OCC = 4) |
| 1 layer, port 11, 13, $n_{SCID}$ = 0 (OCC = 4) |
| 1 layer, port 11, 13, $n_{SCID}$ = 1 (OCC = 4) |

A value necessary to be newly defined in case of dual codeword or a value already defined in Table 4 can be added to a case of a single codeword. By doing so, it may be able to indicate $n_{SCID}$=0 or 1 for the single codeword as well and it is helpful for supporting MU-MIMO. And, if DM-RS port 11 and 13 are indicated for the single codeword, it may be able to implement multi-user MIMO that supports more UEs.

To this end, it may use a reserved state of Table 4. In particular, in case of a single codeword, an index 15 is used. In case of dual codeword, indexes 12 to 15 are used. Yet, in case of the dual codeword, since it is necessary to newly define maximum 6 values, the number of reserved states may be insufficient. Hence, it may be able to define 4 values only by selecting 4 values from among the 6 values. For example, it may be able to select the four values by using values of which OCC=4, DM-RS ports 7-8, or nSCID=0 among the 6 values.

Or, if high-rank transmission (e.g., rank 3 or rank 4) is not supported in the DM-RS based open-loop transmission, a value corresponding to a high-rank in Table 4 can be redefined for a rank supported in the DM-RS based open-loop transmission.

Or, if multi-user MIMO is not considered in the DM-RS based open-loop transmission, $n_{SCID}$ can be used in a manner of being fixed by 0. In particular, Table 4 can be redefined by a case that the $n_{SCID}$ corresponds to 0 only. In this case, values to be newly defined are defined by a configuration that satisfies $n_{SCID}$=0.

Similarly, Table 3 is also redefined for the DM-RS based open-loop transmission. In particular, in Table 3, in case of a single codeword, since {DM-RS port 7-8, 2 layers} is defined in an index 4, it is necessary to newly define {DM-RS port 7-8, 1 layer}. In case of dual codeword, since information corresponding to 2 layers is already defined in an index 0 and an index 1, it is necessary to newly define information corresponding to 1 layer. In this case, in case of dual codeword, it is necessary to newly define {DM-RS port 7-8, 1 layer, $n_{SCID}$=O} and {DM-RS port 7-8, 1 layer, $n_{SCID}$=1} as information corresponding to 2 layers.

A value necessary to be newly defined in case of dual codeword or a value already defined in Table 3 can be added to a case of a single codeword. By doing so, it may be able to indicate $n_{SCID}$=0 or 1 for the single codeword as well and it is helpful for supporting MU-MIMO.

In order to define a new value in Table 3, the schemes proposed in Table 4 (utilizing a reserved state, excluding high-rank information, excluding multi-user MIMO, etc.) can be applied as it is.

If the DM-RS based open-loop transmission is supported for ranks 3 and 4, similar to the ranks 1 and 2, it is necessary to modify a DM-RS configuration table to indicate both a layer 3 and a layer 4 for DM-RS ports 7-10. Yet, if the DM-RS based open-loop transmission uses the DM-RS ports 7-10 for the ranks 3 and 4, since 24 REs/PRB are used for transmitting a DM-RS, DM-RS overhead increases. Hence, it is preferable to use ports 7, 8, 11, and 13 instead of the DM-RS ports 7-10 to maintain the DM-RS overhead using 12 REs/PRB. In this case, it is necessary to add such a value as {3 layers, Port 7, 8, 11, 13} and {4 layers, Port 7, 8, 11, 13} to the DM-RS table. Of course, if the DM-RS ports 7-10 are used, it is necessary to add such a value as {3 layers, Port 7, 8, 9, 10} and {4 layers, Port 7, 8, 9, 10} to the DM-RS table.

Similarly, in order to define a new value in Table 3, the schemes proposed in Table 4 (utilizing a reserved state, excluding high-rank information, excluding multi-user MIMO, etc.) can be applied as it is.

Meanwhile, if the maximum rank is restricted to 2 in the DM-RS based open-loop transmission, it may be able to apply Table 6 described in the following.

TABLE 6

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layers, ports 7-8, $n_{SCID}$ = 0 (OCC = 2) | 0 | 2 layers, ports 7-8, $n_{SCID}$ = 0 (OCC = 2) |
| 1 | 1 layers, ports 7-8, $n_{SCID}$ = 1 (OCC = 2) | 1 | 2 layers, ports 7-8, $n_{SCID}$ = 1 (OCC = 2) |
| 2 | 1 layers, ports 11, 13, $n_{SCID}$ = 0 (OCC = 4) | 2 | 2 layers, ports 11, 13, $n_{SCID}$ = 0 (OCC = 4) |
| 3 | 1 layers, ports 11, 13, $n_{SCID}$ = 1 (OCC = 4) | 3 | 2 layers, ports 11, 13, $n_{SCID}$ = 1 (OCC = 4) |
| 4 | 2 layers, ports 7-8 (or reserved) | 4 | 2 layers, ports 7-8, $n_{SCID}$ = 0 (OCC = 4) |
| 5 | 2 layers, ports 11, 13 (or reserved) | 5 | 2 layers, ports 7-8, $n_{SCID}$ = 1 (OCC = 4) |
| 6 | 1 layers, ports 7-8, $n_{SCID}$ = 0 (OCC = 4) | 6 | |
| 7 | 1 layers, ports 7-8, $n_{SCID}$ = 1 (OCC = 4) | 7 | |

In one codeword of Table 6, indexes 4 and 5 are used for the usage of retransmission. In a legacy DM-RS transmission mode, in case of dual codeword, 3 or more layers are transmitted. In this case, one codeword is transmitted via two layers. In this case, when it fails to decode one codeword, which is transmitted via two layers, and the codeword is retransmitted, since a case of retransmitting one codeword via two layers occurs, 2-layer transmission for one codeword is defined in the legacy DM-RS table to enable retransmission.

Yet, if the DM-RS based open-loop transmission is restricted to rank 2, the aforementioned case does not occur. Hence, a case of two layers in one codeword may not be defined. Although the case of two layers in one codeword is defined, {2 layers, ports 7-8} defined in the legacy DM-RS table is still supported. Yet, {2 layers, ports 11, 13} is not supported and it may not be defined in the DM-RS table itself.

Although the DM-RS based open-loop transmission is restricted to the rank 2 or a lower rank, if it is permitted to use the DM-RS ports 11 and 13 as well as the DM-RS ports 7 and 8, it is advantageous in terms of MU-MIMO. If it is permitted to use the DM-RS ports 7 and 8 only, it is unable to support orthogonal MU-MIMO to N number of UEs receiving data via the DM-RS based open-loop transmission and it is able to support quasi-orthogonal MU-MIMO only. The orthogonal MU-MIMO means that DM-RS ports used for each UE to receive data via MU-MIMO are orthogonal to each other. Since DM-RSs received by UEs different from each other do not cause any interference, it may be able to enhance channel estimation accuracy.

As shown in Table 6, the DM-RS configuration table is defined to make the DM-RS ports 11 and 13 to be selected. By doing so, it may be able to support the orthogonal MU-MIMO. For example, an index 2 and an index 6 are indicated to a UE 2 and a UE 1, respectively. Then, the UE 1 receives single layer data via DM-RS ports 7 and 8 OCC=4 and the UE 2 receives single layer data via DM-RS ports 1 and 13 OCC=4 at the same time. In particular, the two UEs receive data using MU-MIMO and DM-RS ports are orthogonal to each other.

Meanwhile, in case of supporting the ranks 3 and 4, it may consider Tables 7 and 8 which are defined based on the Table 6. Referring to Table 7, DM-RS ports 7, 8, 9, and 10 are used for 3-layer and 4-layer transmission. Referring to Table 8, DM-RS ports 7, 8, 11, and 13 are used for 3-layer and 4-layer transmission to lower DM-RS overhead.

TABLE 7

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layers, ports 7-8, $n_{SCID}$ = 0 (OCC = 2) | 0 | 2 layers, ports 7-8, $n_{SCID}$ = 0 (OCC = 2) |
| 1 | 1 layers, ports 7-8, $n_{SCID}$ = 1 (OCC = 2) | 1 | 2 layers, ports 7-8, $n_{SCID}$ = 1 (OCC = 2) |
| 2 | 1 layers, ports 11, 13, $n_{SCID}$ = 0 (OCC = 4) | 2 | 2 layers, ports 11, 13, $n_{SCID}$ = 0 (OCC = 4) |
| 3 | 1 layers, ports 11, 13, $n_{SCID}$ = 1 (OCC = 4) | 3 | 2 layers, ports 11, 13, $n_{SCID}$ = 1 (OCC = 4) |
| 4 | 2 layers, ports 7-8 (or reserved) | 4 | 2 layers, ports 7-8, $n_{SCID}$ = 0 (OCC = 4) |
| 5 | 2 layers, ports 11, 13 (or reserved) | 5 | 2 layers, ports 7-8, $n_{SCID}$ = 1 (OCC = 4) |
| 6 | 1 layers, ports 7-8, $n_{SCID}$ = 0 (OCC = 4) | 6 | 3 layers, ports 7-9 |
| 7 | 1 layers, ports 7-8, $n_{SCID}$ = 1 (OCC = 4) | 7 | 4 layers, ports 7-10 |

TABLE 8

| | One Codeword:<br>Codeword 0 enabled,<br>Codeword 1 disabled | | Two Codewords:<br>Codeword 0 enabled,<br>Codeword 1 enabled |
|---|---|---|---|
| Value | Message | Value | Message |
| 0 | 1 layers, ports 7-8, $n_{SCID}$ = 0 (OCC = 2) | 0 | 2 layers, ports 7-8, $n_{SCID}$ = 0 (OCC = 2) |
| 1 | 1 layers, ports 7-8, $n_{SCID}$ = 1 (OCC = 2) | 1 | 2 layers, ports 7-8, $n_{SCID}$ = 1 (OCC = 2) |
| 2 | 1 layers, ports 11, 13, $n_{SCID}$ = 0 (OCC = 4) | 2 | 2 layers, ports 11, 13, $n_{SCID}$ = 0 (OCC = 4) |

TABLE 8-continued

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 3 | 1 layers, ports 11, 13, $n_{SCID} = 1$ (OCC = 4) | 3 | 2 layers, ports 11, 13, $n_{SCID} = 1$ (OCC = 4) |
| 4 | 2 layers, ports 7-8 (or reserved) | 4 | 2 layers, ports 7-8, $n_{SCID} = 0$ (OCC = 4) |
| 5 | 2 layers, ports 11, 13 (or reserved) | 5 | 2 layers, ports 7-8, $n_{SCID} = 1$ (OCC = 4) |
| 6 | 1 layers, ports 7-8, $n_{SCID} = 0$ (OCC = 4) | 6 | 3 layers, ports 7, 8, 11, 13 |
| 7 | 1 layers, ports 7-8, $n_{SCID} = 1$ (OCC = 4) | 7 | 4 layers, ports 7, 8, 11, 13 |

When a newly defined table is used for the DM-RS based open-loop transmission, an eNB can inform a UE of the use of the table via RRC signaling.

Meanwhile, in case of using a DM-RS based (semi) open-loop transmission scheme in transmission modes 9 and 10, DM-RS information transmitted via a DCI format 2C/DCI format 2D can be defined as Table 9 or Table 10. An eNB can designate a configuration table to be used for the DCI 2C/2D among the legacy DM-RS configuration table and a DM-RS configuration table newly defined for the DM-RS based (semi) open-loop transmission via RRC signaling.

TABLE 9

| One Codeword: Codeword 0 enabled, Codeword 1 disabled | | Two Codewords: Codeword 0 enabled, Codeword 1 enabled | |
| --- | --- | --- | --- |
| Value | Message | Value | Message |
| 0 | 2 layers, ports 7-8, $n_{SCID} = 0$ | 0 | 2 layers, ports 7-8, $n_{SCID} = 0$ |
| 1 | 2 layers, ports 7-8, $n_{SCID} = 1$ | 1 | 2 layers, ports 7-8, $n_{SCID} = 1$ |

As mentioned in the foregoing description, according to current standardization discussion, if the DM-RS based (semi) open-loop transmission scheme is applied, an SFBC-based transmission diversity scheme is used for the rank 1 as shown in the equation 20 and a co-phase cycling scheme is used for the rank 2 as shown in the equation 21. Hence, if the DM-RS antenna ports 7 and 8 are used for both the rank 1 and the rank 2, it may be able to perform 2-layer downlink transmission.

Referring to the Tables 3 to 9, the DM-RS configuration table includes the number of layers, DM-RS port information, $n_{SCID}$, and OCC (orthogonal cover code) information. Yet, it is difficult to know a semi open-loop transmission scheme of downlink data (i.e., SFBC-based transmission diversity scheme/co-phase cycling scheme) using the 4 DM-RS information. Hence, it is necessary for an eNB to indicate information on a transmission scheme in addition to DCI.

To this end, it may consider performing joint encoding not only on the number of layers, DM-RS port information, nSCID, and OCC information but also on semi open-loop transmission scheme information in the DM-RS configuration table.

Or, it may be able to define rank information (rank 1/rank 2) as well as the number of layers, DM-RS port information, nSCID, and OCC information. If the rank information indicates the rank 1, it can be comprehended as the SFBC-based transmission diversity scheme. If the rank information indicates the rank 2, it can be comprehended as the co-phase cycling scheme.

Or, it may be able to implicitly indicate a scheme by combining semi open-loop transmission scheme information with the number of enabled codewords without an additional indication. In particular, if one codeword is enabled, it may indicate that downlink data is transmitted using the SFBC-based transmission diversity scheme. If dual codewords are enabled, it may indicate that downlink data is transmitted using the co-phase cycling scheme.

In order to achieve the same purpose, in case of one codeword, it may be able to define to permit rank 1 transmission only to indirectly signal that the SFBC-based transmission diversity scheme is used for one codeword. Similarly, in case of dual codewords, it may be able to define to permit rank 2 transmission only to indirectly signal that the co-phase cycling scheme is used for dual codewords. According to the codeword to layer mapping rule defined in current LTE standard, if dual codeword is enabled, rank 2 transmission is always performed. Hence, if it is defined to permit the rank 2 transmission for the dual codeword, it may be somewhat overlapped. Hence, it is preferable to permit the rank 1 transmission to be performed only when one codeword is enabled.

For example, If DM-RS based (semi) open-loop transmission is configured or enabled via RRC signaling, it may be able to implement one of following operations.

The number of transmission rank is equal to 2 if both codewords are enabled; transmit diversity is used if codeword 0 is enabled while codeword 1 is disabled.

Co-phase cycling scheme is used if both codewords are enabled; Transmit diversity is used if codeword 0 is enabled while codeword 1 is disabled.

In the Table 9, since information common irrespective of an index is meaningless, the information can be excluded from the table. For example, it may define $n_{SCID}$ only in the Table 9. In the Table 9, it may be able to define a DM-RS configuration irrespective of the number of enabled codewords.

Or, it may be able to connect $n_{SCID}$ information with the semi open-loop transmission scheme information. If the $n_{SCID}$ corresponds to 0, it may assume that data is transmitted using the SFBC-based transmission diversity scheme. If the $n_{SCID}$ corresponds to 1, it may assume that data is transmitted using the co-phase cycling scheme.

Table 10 in the following corresponds to a DM-RS configuration table to which the OCC information and the DM-RS ports 11 and 13 of the Table 9 are added. In case of using the Table 9, it is impossible to configure two UEs with orthogonal MU-MIMO. In this case, quasi-orthogonal MU-MIMO configuration is available only. On the contrary, in case of using the Table 10, it may be able to perform orthogonal MU-MIMO transmission for the maximum two UEs.

Since the Table 9 and the Table 10 have a difference in MU-MIMO performance, if an eNB determines that it is necessary to enhance the MU-MIMO performance, the eNB sets the Table 10 to a UE via RRC signaling. Otherwise, the eNB sets the Table 9 to the UE via RRC signaling to reduce a DCI payload size, i.e., downlink control information overhead.

TABLE 10

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 2 layers, ports 7-8, $n_{SCID}$ = 0 (OCC = 2) | 0 | 2 layers, ports 7-8, $n_{SCID}$ = 0 (OCC = 2) |
| 1 | 2 layers, ports 7-8, $n_{SCID}$ = 1 (OCC = 2) | 1 | 2 layers, ports 7-8, $n_{SCID}$ = 1 (OCC = 2) |
| 2 | 2 layers, ports 11, 13, $n_{SCID}$ = 0 (OCC = 4) | 2 | 2 layers, ports 11, 13, $n_{SCID}$ = 0 (OCC = 4) |
| 3 | 2 layers, ports 11, 13, $n_{SCID}$ = 1 (OCC = 4) | 3 | 2 layers, ports 11, 13, $n_{SCID}$ = 1 (OCC = 4) |
| 4 | 2 layers, ports 7-8, $n_{SCID}$ = 0 (OCC = 4) | 4 | 2 layers, ports 7-8, $n_{SCID}$ = 0 (OCC = 4) |
| 5 | 2 layers, ports 7-8, $n_{SCID}$ = 1 (OCC = 4) | 5 | 2 layers, ports 7-8, $n_{SCID}$ = 1 (OCC = 4) |
| 6 | Reserved | 6 | Reserved |
| 7 | Reserved | 7 | Reserved |

In case of performing semi open-loop transmission on the ranks 3 and 4, it is preferable to use Table 11 which is modified from the Table 10. According to the Table 11 described in the following, if a dual codeword is enabled, an index 6 and an index 7 are defined as 3-layer transmission and 4-layer transmission, respectively. If a single codeword is enabled only, it is not necessary to modify the Table 10.

TABLE 11

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 2 layers, ports 7-8, $n_{SCID}$ = 0 (OCC = 2) | 0 | 2 layers, ports 7-8, $n_{SCID}$ = 0 (OCC = 2) |
| 1 | 2 layers, ports 7-8, $n_{SCID}$ = 1 (OCC = 2) | 1 | 2 layers, ports 7-8, $n_{SCID}$ = 1 (OCC = 2) |
| 2 | 2 layers, ports 11, 13, $n_{SCID}$ = 0 (OCC = 4) | 2 | 2 layers, ports 11, 13, $n_{SCID}$ = 0 (OCC = 4) |
| 3 | 2 layers, ports 11, 13, $n_{SCID}$ = 1 (OCC = 4) | 3 | 2 layers, ports 11, 13, $n_{SCID}$ = 1 (OCC = 4) |
| 4 | 2 layers, ports 7-8, $n_{SCID}$ = 0 (OCC = 4) | 4 | 2 layers, ports 7-8, $n_{SCID}$ = 0 (OCC = 4) |
| 5 | 2 layers, ports 7-8, $n_{SCID}$ = 1 (OCC = 4) | 5 | 2 layers, ports 7-8, $n_{SCID}$ = 1 (OCC = 4) |
| 6 | Reserved | 6 | Reserved |
| 7 | Reserved | 7 | Reserved |

In case of retransmitting a single codeword, whether to use a semi open-loop transmission scheme may vary depending on whether the codeword is initially transmitted via 1 layer or two layers. If the codeword is initially transmitted via 1 layer, since the codeword is initially transmitted by rank 1, the codeword is retransmitted using the SFBC-based transmission diversity scheme. On the contrary, if the codeword is initially transmitted via 2 layers, since the codeword is initially transmitted by rank 2, the codeword is retransmitted using the co-phase cycling scheme. Since a UE is aware of codeword to layer mapping information at the time of initial transmission, the UE assumes the semi open-loop transmission scheme in accordance with the codeword to layer mapping information at the time of retransmission. Or, as shown in Table 12 in the following, it may be able to additionally define a separate value in the DM-RS configuration table to indicate the semi open-loop transmission scheme. In particular, in the Table 12, in case of a single codeword, indexes 8 to 13 correspond to a DM-RS configuration capable of being applied to retransmission only.

TABLE 12

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | SFBC, 2 layers, ports 7-8, $n_{SCID}$ = 0 (OCC = 2) | 0 | 2 layers, ports 7-8, $n_{SCID}$ = 0 (OCC = 2) |
| 1 | SFBC, 2 layers, ports 7-8, $n_{SCID}$ = 1 (OCC = 2) | 1 | 2 layers, ports 7-8, $n_{SCID}$ = 1 (OCC = 2) |
| 2 | SFBC, 2 layers, ports 11, 13, $n_{SCID}$ = 0 (OCC = 4) | 2 | 2 layers, ports 11, 13, $n_{SCID}$ = 0 (OCC = 4) |
| 3 | SFBC, 2 layers, ports 11, 13, $n_{SCID}$ = 1 (OCC = 4) | 3 | 2 layers, ports 11, 13, $n_{SCID}$ = 1 (OCC = 4) |
| 4 | SFBC, 2 layers, ports 7-8, $n_{SCID}$ = 0 (OCC = 4) | 4 | 2 layers, ports 7-8, $n_{SCID}$ = 0 (OCC = 4) |
| 5 | SFBC, 2 layers, ports 7-8, $n_{SCID}$ = 1 (OCC = 4) | 5 | 2 layers, ports 7-8, $n_{SCID}$ = 1 (OCC = 4) |
| 6 | Reserved | 6 | 3 layers, ports 7-9 |
| 7 | Reserved | 7 | 4 layers, ports 7-10 |
| 8 | Cophase cycling, 2 layers, ports 7-8, nSCID = 0 (OCC = 2) | 8 | Reserved |
| 9 | Cophase cycling, 2 layers, ports 7-8, nSCID = 1 (OCC = 2) | 9 | Reserved |
| 10 | Cophase cycling, 2 layers, ports 11, 13, nSCID = 0 (OCC = 4) | 10 | Reserved |

TABLE 12-continued

| One Codeword: Codeword 0 enabled, Codeword 1 disabled | | Two Codewords: Codeword 0 enabled, Codeword 1 enabled | |
|---|---|---|---|
| Value | Message | Value | Message |
| 11 | Cophase cycling, 2 layers, ports 11, 13, nSCID = 1 (OCC = 4) | 11 | Reserved |
| 12 | Cophase cycling, 2 layers, ports 7-8, nSCID = 0 (OCC = 4) | 12 | Reserved |
| 13 | Cophase cycling, 2 layers, ports 7-8, nSCID = 1 (OCC = 4) | 13 | Reserved |
| 14 | Reserved | 14 | Reserved |
| 15 | Reserved | 15 | Reserved |

Or, in order to simplify implementation, it may consider retransmitting the both cases using the SFBC-based transmission diversity scheme.

Similarly, in case of performing the semi open-loop transmission on the rank 3 and the rank 4, it may use Tables 13 and 14 modified form the Table 9. In particular, in the Table 14, in case of a single codeword, indexes 2 and 3 correspond to a DM-RS configuration capable of being applied to retransmission only.

TABLE 13

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 2 layers, ports 7-8, $n_{SCID} = 0$ | 0 | 2 layers, ports 7-8, $n_{SCID} = 0$ |
| 1 | 2 layers, ports 7-8, $n_{SCID} = 1$ | 1 | 2 layers, ports 7-8, $n_{SCID} = 1$ |
| 0 | Reserved | 2 | 3 layers, ports 7-9 |
| 1 | Reserved | 3 | 4 layers, ports 7-10 |

TABLE 14

| One Codeword: Codeword 0 enabled, Codeword 1 disabled | | Two Codewords: Codeword 0 enabled, Codeword 1 enabled | |
|---|---|---|---|
| Value | Message | Value | Message |
| 0 | 2 layers, ports 7-8, $n_{SCID} = 0$ | 0 | 2 layers, ports 7-8, $n_{SCID} = 0$ |
| 1 | 2 layers, ports 7-8, $n_{SCID} = 1$ | 1 | 2 layers, ports 7-8, $n_{SCID} = 1$ |
| 0 | Reserved | 2 | 3 layers, ports 7-9 |
| 1 | Reserved | 3 | 4 layers, ports 7-10 |

Of course, although DM-RS ports 7, 8, 9, and 10 are used to perform 2-layer transmission and 4-layer transmission for clarity, when 3-layer transmission and 4-layer transmission are performed, it may also be able to use DM-RS ports 7, 8, 11, and 13 to reduce DM-RS overhead.

Meanwhile, in case of a fast moving situation to which semi open-loop transmission is applied, MU-MIMO management requiring high channel accuracy may not be appropriate for the case. Hence, it may consider a scheme of fixing the $n_{SCID}$ to 0 all the time without the $n_{SCID}$, OCC information, and the like or a scheme of semi-statically designating the $n_{SCID}$ via RRC/MAC CE signaling. In this case, since it is not necessary to dynamically signal the $n_{SCID}$, the OCC information, and the like, a DM-RS configuration field is unnecessary in the DCI format 2C/DCI format 2D. A DM-RS is used in a manner of being fixed by {2 layers, ports 7-8} all the time.

In addition, it may be able to signal whether or not an eNB provides DM-RS information via DCI according to the necessity of MU-MIMO management, whether or not the eNB provides $n_{SCID}$ information only (using Table 9, 13, or 14), whether or not the eNB provides the $n_{SCID}$, the OCC information, and the DM-RS port information (using the Table 10, 11, or 12) via RRC/MAC CE. For example, if it is not necessary to manage the MU-MIMO, the eNB signals a UE that the eNB does not dynamically provide DM-RS information to the UE and {2 layers, ports 7-8, nSCID=0} is managed in a manner of being fixed via RRC/MAC CE. On the contrary, if it is necessary to manage the MU-MIMO, the eNB can separately signal the UE that the eNB indicates values of Table 9 or Table 10 using DCI via RRC/MAC CE.

Figure 9:
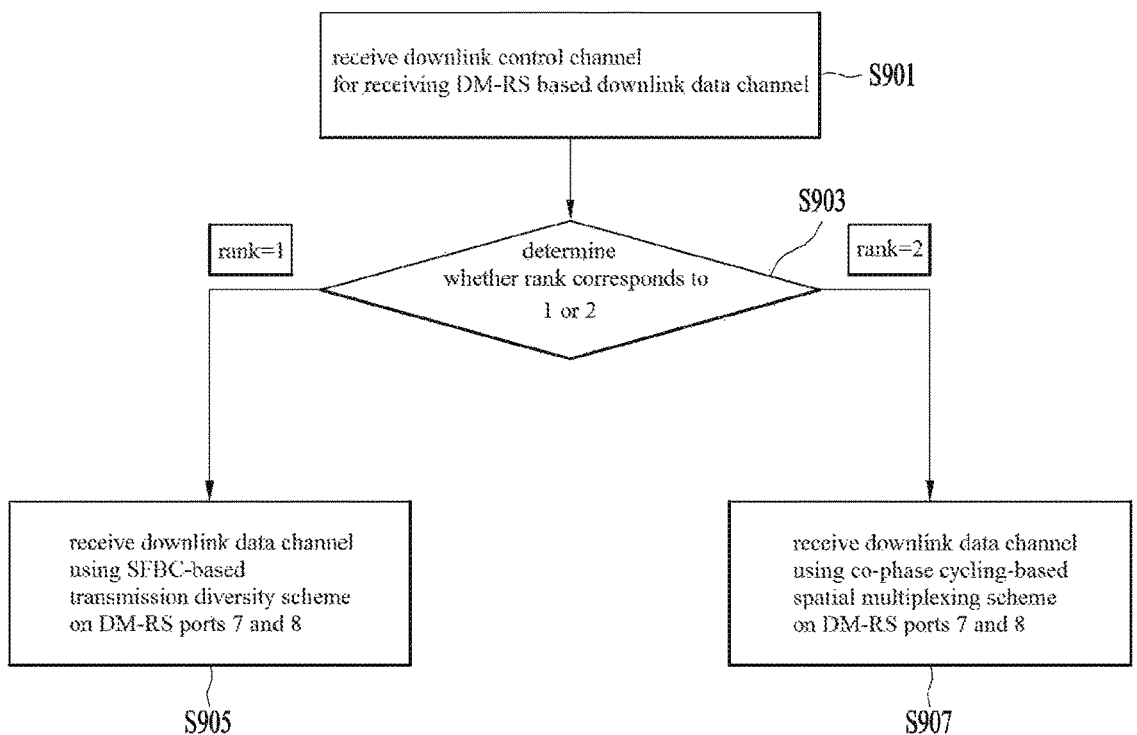
FIG. 9 is a flowchart for a method of receiving a DM-RS based downlink signal according to embodiment of the present invention.

FIG. 9 is a flowchart for a method of receiving a DM-RS based downlink signal according to embodiment of the present invention.

Referring to FIG. 9, in the step S901, a UE receives a downlink control channel (i.e., PDCCH) to receive a downlink data channel (i.e., PDSCH) by performing DM-RS based open-loop MIMO transmission. Specifically, the PDCCH can include a DCI format 2C or a DCI format 2D. Subsequently, in the step S903, the UE determines whether the number of codewords (i.e., rank) included in the PDSCH corresponds to 1 or 2.

If the rank corresponds to 1, as shown in the step S905, the UE receives the PDSCH using an SFBC (space frequency block coding)-based transmission diversity scheme on antenna ports 7 and 8. In particular, the UE assumes that the PDSCH of the rank 1 is transmitted according to equation 20.

On the contrary, if the rank corresponds to 2, as shown in the step S907, the UE receives the PDSCH using a co-phase cycling-based spatial multiplexing scheme on antenna ports 7 and 8. In particular, the UE assumes that the PDSCH of the rank 2 is transmitted according to equation 21.

Figure 10:
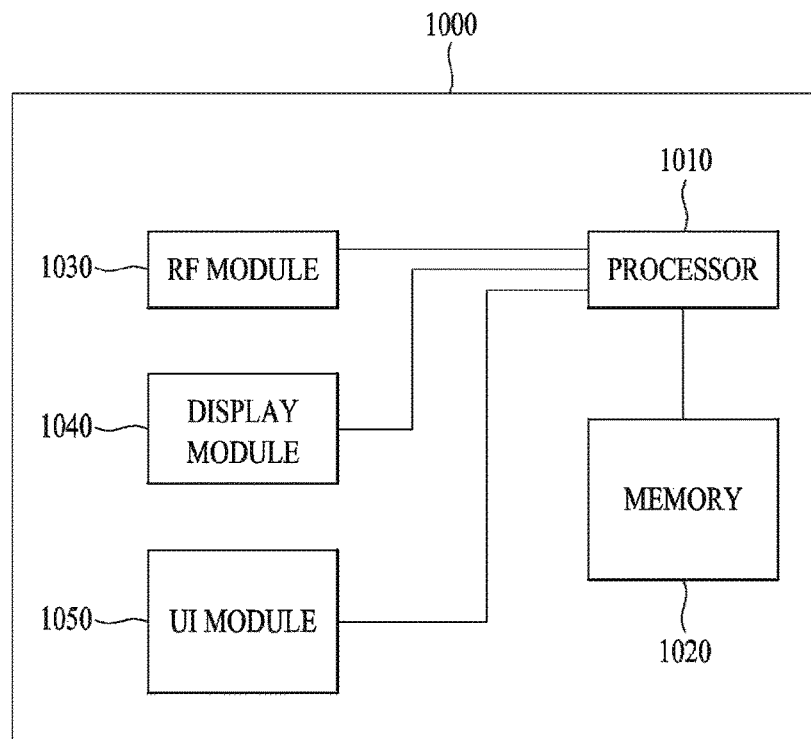
FIG. 10 is a block diagram of a communication apparatus according to an embodiment of the present invention.

FIG. 10 is a block diagram of a communication apparatus according to an embodiment of the present invention.

Referring to FIG. 10, a communication apparatus 1000 includes a processor 1010, a memory 1020, an RF module 1030, a display module 1040, and a User Interface (UI) module 1050.

The communication device 1000 is shown as having the configuration illustrated in FIG. 10, for the convenience of description. Some modules may be added to or omitted from the communication apparatus 1000. In addition, a module of the communication apparatus 1000 may be divided into more modules. The processor 1010 is configured to perform operations according to the embodiments of the present invention described before with reference to the drawings. Specifically, for detailed operations of the processor 1010, the descriptions of FIGS. 1 to 9 may be referred to.

The memory 1020 is connected to the processor 1010 and stores an Operating System (OS), applications, program codes, data, etc. The RF module 1030, which is connected to the processor 1010, upconverts a baseband signal to an RF signal or downconverts an RF signal to a baseband signal. For this purpose, the RF module 1030 performs digital-to-analog conversion, amplification, filtering, and frequency upconversion or performs these processes reversely. The display module 1040 is connected to the processor 1010 and displays various types of information. The display module 1040 may be configured as, not limited to, a known component such as a Liquid Crystal Display (LCD), a Light Emitting Diode (LED) display, and an Organic Light Emitting Diode (OLED) display. The UI module 1050 is connected to the processor 1010 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

According to an embodiment of the present invention, it is possible to efficiently report feedback information for division beamforming in a wireless communication system.

It will be appreciated by persons skilled in the art that that the effects that can be achieved through the present invention are not limited to what has been particularly described hereinabove and other advantages of the present invention will be more clearly understood from the following detailed description.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of configuring a reference signal for open-loop multi antenna transmission in a wireless communication system and an apparatus therefor are described with reference to examples applied to 3GPP LTE system, it may be applicable to various kinds of wireless communication systems as well as the 3GPP LTE system.

What is claimed is:

1. A method of receiving a downlink (DL) channel from an enhanced Node B (eNB) in a wireless communication system, the method performed by a user equipment (UE) and comprising:
   receiving, from the eNB, a DL control channel for receiving a demodulation reference signal (DM-RS)-based DL data channel, wherein the DL control channel includes DM-RS configuration information; and
   receiving the DM-RS-based DL data channel via 2 layers on antenna ports 7 and 8 indicated by an indicator included in the DM-RS configuration information,
   wherein semi open loop transmission is configured for the UE,
   wherein, when a scrambling identifier of the DM-RS included in the DM-RS configuration information is set to 0,
   the DM-RS-based DL data channel is received using one of a transmission diversity scheme or a spatial multiplexing scheme according to a transmission rank and codeword disabled state information included in the DM-RS configuration information,
   wherein the codeword disabled state information is information including whether one of two codewords is disabled,
   wherein when one of the two codewords is disabled and a number of the transmission rank is equal to 1, the DM-RS-based DL data channel is received using a space frequency block coding (SFBC)-based transmission diversity scheme, and
   wherein when the two codewords are enabled and the number of the transmission rank is equal to 2, the DM-RS-based DL data channel is received using a co-phased cycling-based spatial multiplexing scheme.

2. The method of claim 1, wherein the DM-RS configuration information indicates that the DM-RS is received via a first layer corresponding to antenna port 7 and a second layer corresponding to antenna port 8.

3. A method of transmitting a downlink (DL) channel to a user equipment (UE) in a wireless communication system, the method performed by an enhanced Node B (eNB) and comprising:

transmitting, to the UE, a DL control channel for a demodulation reference signal (DM-RS)-based DL data channel, wherein the DL control channel includes DM-RS configuration information; and transmitting, to the UE, the DM-RS-based DL data channel via 2 layers on antenna ports 7 and 8 indicated by an indicator in the DM-RS configuration information, wherein semi open loop transmission is configured for the UE, wherein, when a scrambling identifier of the DM-RS included in the DM-RS configuration information is set to 0, the DM-RS-based DL data channel is transmitted using one of a transmission diversity scheme or a spatial multiplexing scheme according to a transmission rank and codeword disabled state information included in the DM-RS configuration information, wherein the codeword disabled state information is information including whether one of two codewords is disabled, and wherein when one of the two codewords is disabled and a number of the transmission rank is equal to 1, the DM-RS-based DL data channel is transmitted using a space frequency block coding (SFBC)-based transmission diversity scheme, and wherein when the two codewords are enabled and the number of the transmission rank is equal to 2, the DM-RS-based DL data channel is transmitted using a co-phase cycling-based spatial multiplexing scheme.

4. The method of claim 3, wherein the DM-RS configuration information indicates that the DM-RS is transmitted via a first layer corresponding to antenna port 7 and a second layer corresponding to antenna port 8.

* * * * *